United States Patent [19]

Doering

[11] Patent Number: 4,492,271

[45] Date of Patent: Jan. 8, 1985

[54] TINE TILLER WITH TINES AND WHEELS EACH ROTATABLE IN EITHER DIRECTION

[75] Inventor: Charles W. Doering, New Albany, Ind.

[73] Assignee: Brinly-Hardy Co., Inc., Louisville, Ky.

[21] Appl. No.: 397,479

[22] Filed: Jul. 12, 1982

[51] Int. Cl.³ .............................................. A01B 33/00
[52] U.S. Cl. ..................................... 172/43; 172/114; 172/123; 172/125; 474/1
[58] Field of Search ........................ 172/43, 42, 56, 60, 172/114, 125, 123; 180/19 R; 474/1, 88, 89

[56] References Cited

U.S. PATENT DOCUMENTS

| | | | |
|---|---|---|---|
| 2,722,841 | 11/1955 | Becker | 180/19.1 |
| 2,903,077 | 9/1959 | Kamlukin | 172/42 |
| 3,557,880 | 1/1971 | Van Der Lely | 172/123 |

FOREIGN PATENT DOCUMENTS

| | | | |
|---|---|---|---|
| 182307 | 2/1936 | Switzerland | 172/42 |
| 811189 | 4/1959 | United Kingdom | 172/125 |
| 901053 | 7/1962 | United Kingdom | 172/42 |

Primary Examiner—Richard T. Stouffer
Assistant Examiner—William H. Honaker
Attorney, Agent, or Firm—Frank C. Leach, Jr.

[57] ABSTRACT

A tine tiller has a frame mounted on traction wheels for movement in either direction. The frame has tines rotatably mounted on each side thereof and driven in either direction irrespective of the direction of movement of the frame by rotation of the traction wheels. The speed of rotation of the traction wheels can be changed without stopping movement of the frame.

6 Claims, 31 Drawing Figures

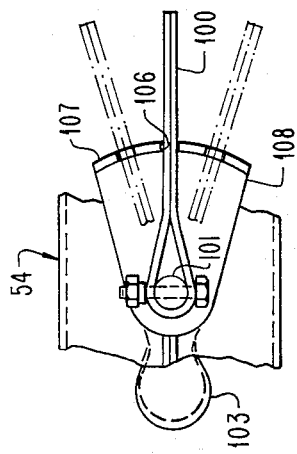
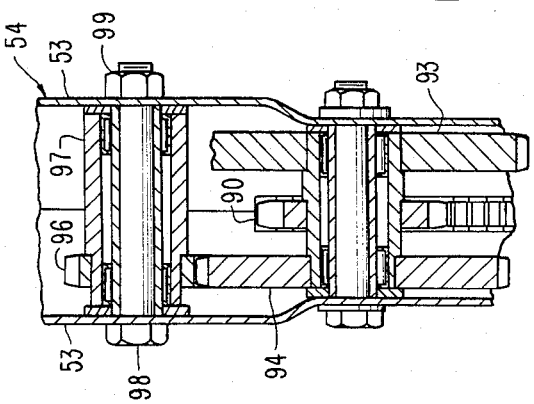
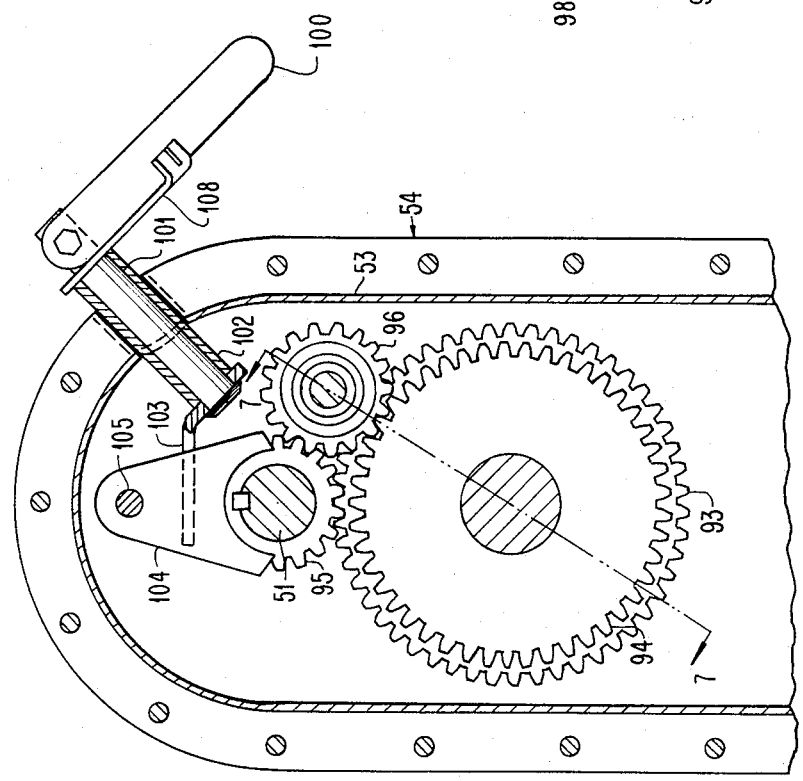

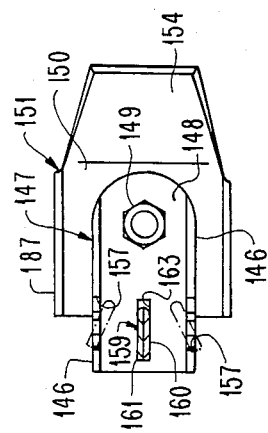
FIG. 11
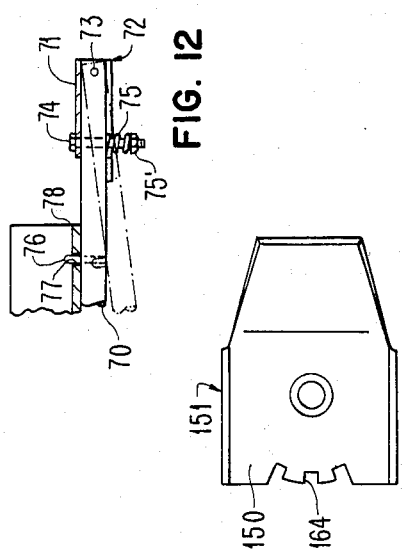
FIG. 12
FIG. 25
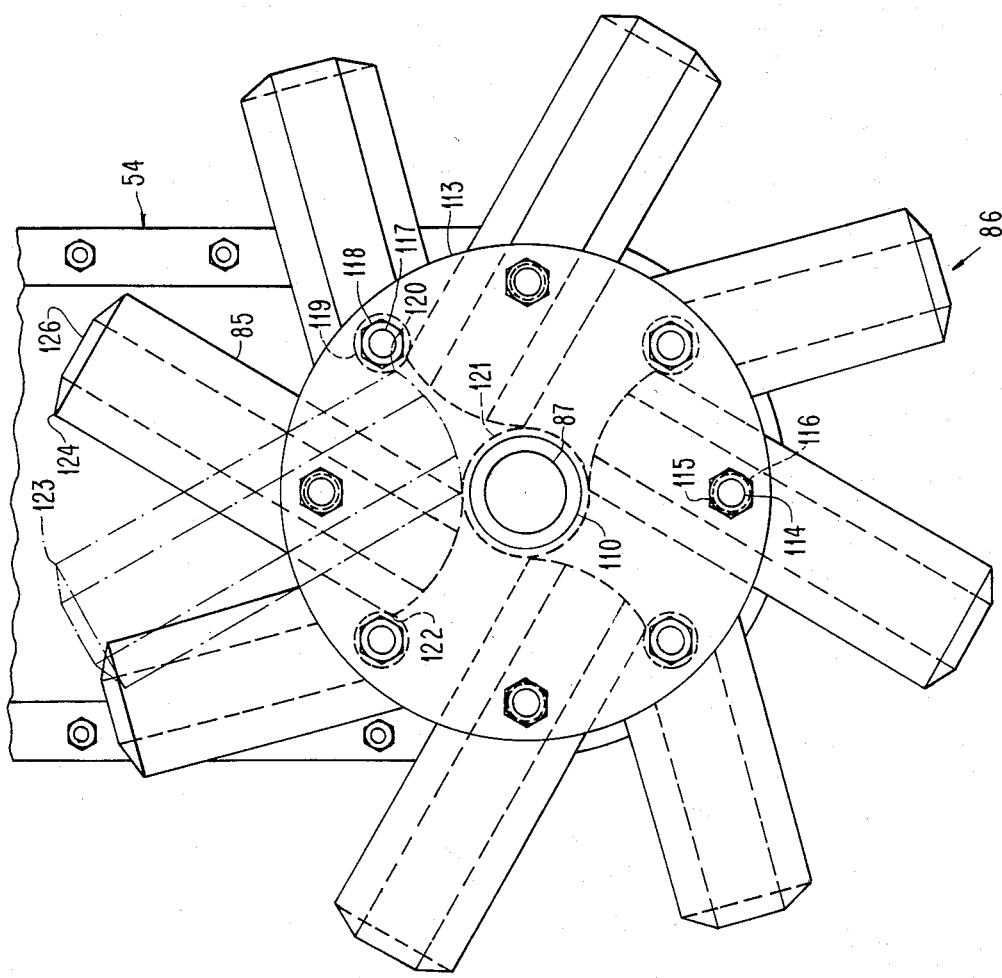
FIG. 6

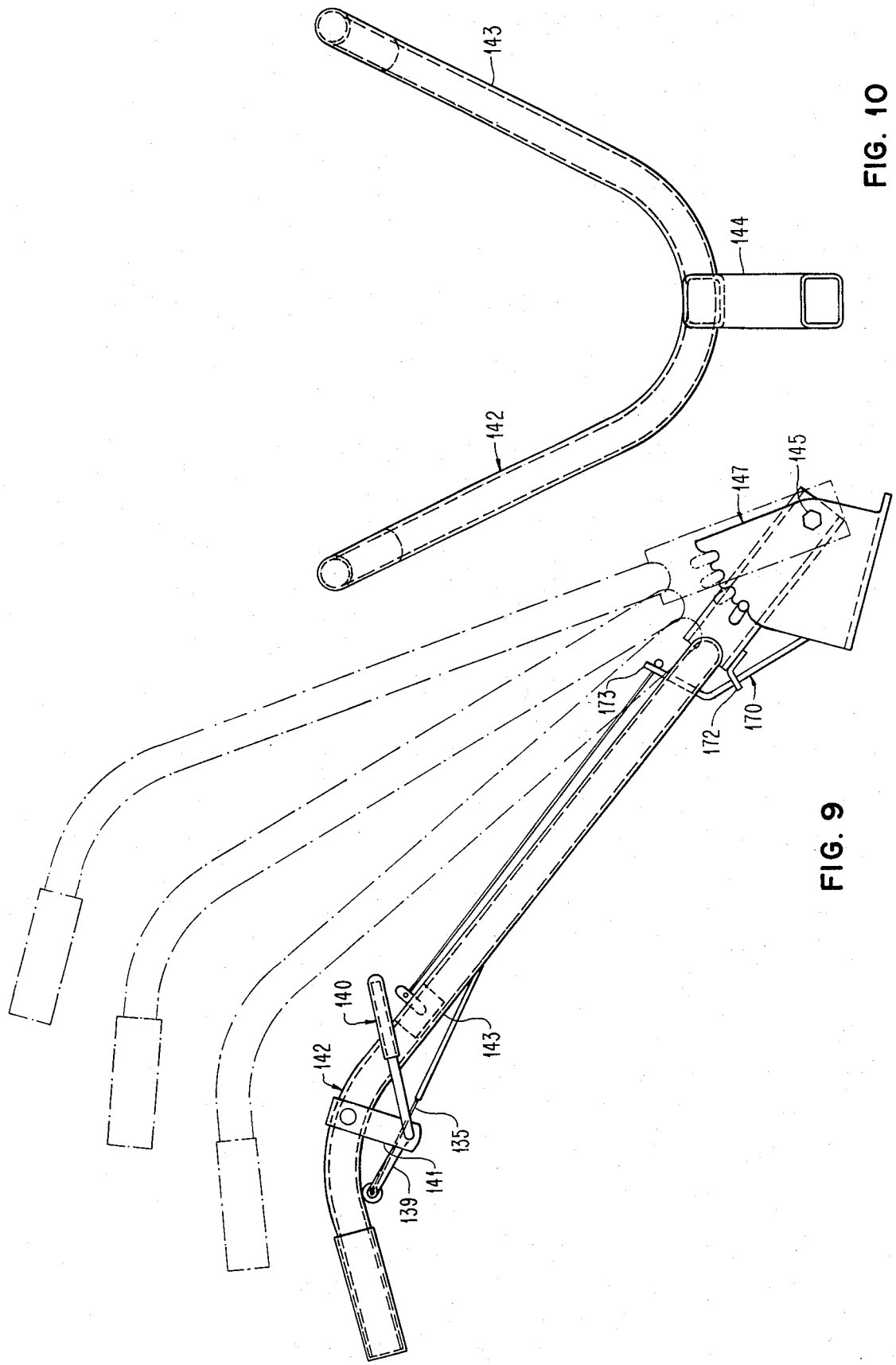

TINE TILLER WITH TINES AND WHEELS EACH ROTATABLE IN EITHER DIRECTION

This invention relates to a tine tiller and, more particularly, to a tine tiller having tines rotating in either direction irrespective of the direction of rotation of the traction wheels advancing the tiller.

Rear tine tillers have rotating tines mounted on its rear end for tilling the soil. In one type of rear tine tiller, the tines rotate in the same direction as the traction wheels advancing the tiller. In another type of rear tine tiller, the direction of rotation of the tines is opposite to the rotation of the traction wheels advancing the tiller. The first type of rotating tine is known as the standard rotating tine while the second type of rotating tine is known as the counter rotating tine.

Each of the standard rotating tine and the counter rotating tine has advantages in utilization in certain conditions. For example, in initial tilling of a heavy sod and/or soil condition, the counter rotating tines are desired because the standard rotating tines want to lift the traction wheels so that the tiller jumps since the tines rotate at about ten times the speed of rotation of the traction wheels. With the standard rotating tines, this condition can be controlled by limiting the depth of the cut and adding extra weight to increase the drive wheel traction or using steel lug wheels as the traction wheels to reduce the lunging action since the steel lugs dig into the ground. The limited depth of the cut requires an increase in the number of passes of the tiller for a selected depth while the added extra weight or the steel lug wheels increase cost and makes the tiller heavier to handle. Thus, when seeking initial tillage of a heavy sod and/or soil condition, the counter rotating tines are more efficient.

However, when chopping vines or long-stemmed vegetable organic material such as corn, beans, pea vines, and the like for humus, the standard tines are preferred. This is because the lifting action of the counter rotating tines would result in excessive wrapping of the long-stemmed plants because of the tines lifting rather than cutting. The downward chopping of the standard rotating tines reduces the wrapping by better cutting of the material. The better cutting of the material produces faster decomposing of the material. Therefore, when chopping long-stemmed vegetable organic material, the standard rotating tines are preferred.

When tilling in a rocky soil, the counter rotating tines propel the rocks forwardly whereby the tines have repeated contact with the same rocks unless the tiller is stopped and the rocks removed. With the standard rotating tines, the tines ride over the rocks. Therefore, in rocky soils, the standard rotating tines are preferred.

When using a tiller for cultivating, each type of tine has certain advantages. For example, the standard rotating tines provide a greater chopping action with a vertical act whereas the counter rotating tines produce a more horizontal sweeping type cutting action, which is similar to the sweeping action produced by pull-type cultivators. It is believed that the counter rotating tines would produce a more thorough cultivating action at higher ground speeds because the tines would till more of the soil since the standard rotating tines do not engage all of the ground with the space between the engaged ground areas increasing as the ground speed of the tiller increases. Furthermore, with the counter rotating tines, adjustable shields could be employed to throw soil between plant rows for lay by action, which is depositing the soil around a plant such as a corn stalk, for example, to smother small weeds that cannot be removed by the tiller.

In an annually prepared garden, each type of tine could be utilized depending upon the soil condition, moisture, and vegetation. The counter rotating tines use available horsepower more efficiently than the standard rotating tines for cutting action so that the counter rotating tines would tend to be utilized in annually prepared gardens unless the soil condition, moisture, or vegetation dictated otherwise.

With the counter rotating tines, the depth of the tilling during a single path can be three times or more greater than that produced during a single pass by the standard rotating tines. However, as previously discussed, the counter rotating tines come up underneath the organic matter to lift it without cutting it so that the organic material does not get as well chopped or mixed into the soil as is obtained with the standard rotating tines. Therefore, the counter rotating tines are not always desirable despite the ability to avoid multiple passes to till the soil to a selected depth.

With the standard rotating tines, the coarseness or texture of the soil can be changed by changing the ground speed of the tine tiller with the rotational speed of the tines remaining constant for a specific engine speed. This cannot be as easily obtained with the counter rotating tines.

The tine tiller of the present invention overcomes the foregoing problems of each of the standard rotating tines and the counter rotating tines through providing a tine tiller in which the tines can be selectively rotated in either direction irrespective of the direction of the rotation of the traction wheels. Thus, the tine tiller of the present invention has the same tines capable of rotating in the standard rotating tine mode or the counter rotating tine mode.

The tine tiller of the present invention accomplishes the foregoing selectivity of rotation of the tines through driving the tines independently of the traction wheels but from the same single motive means. Thus, the speed and direction of the traction wheels can be varied as desired without having any effect on the direction and speed of rotation of the tines.

In order to be able to have the tines till the soil, irrespective of the direction of rotation of the tines, it is necessary for the tines to have cutting edges on opposite edges thereof. That is, when the tines rotate in one direction, the leading edge of the tine must be the cutting edge; when the tines rotate in the opposite direction, the leading edge of the tine also must be the cutting edge.

The tine tiller of the present invention accomplishes this through pivotally mounting the tines for movement between two tilling positions. In a first tilling position when the tines are rotated in one direction, each of the tines has a first cutting edge for engaging the soil to till it. When the tines are rotated in the opposite direction so that the tines are in a second tilling position, each of the tines has a second cutting edge for tilling the soil. By pivotally mounting the tines for movement between the two tilling positions, the tines automatically assume the correct tilling position depending on the direction of rotation of the tines.

It has previously been suggested in U.S. Pat. No. 3,151,685 to Field to have the reversible tines. However, the tines of the aforesaid Field patent produce cutting in only one direction of rotation. In the other direction of rotation, the tines merely pick rather than cutting or slicing.

Additionally, the tine assembly of the aforesaid Field patent must be removed from one side of a rotating drive shaft to transfer it to the other side of the shaft in order to perform the opposite function. That is, in the aforesaid Field patent, picking can occur when the tine assembly is on only one side of the tine tiller and slicing only when the tine assembly is on the other side of the tine tiller.

This has the disadvantage of requiring reverse mounting of the tine assembly to perform the different functions. There is no suggestion in the aforesaid Field patent of performing the slicing and picking actions on the same side of the tine tiller. There also is no suggestion in the aforesaid Field patent of cutting in both directions of rotation as is accomplished with the tine tiller of the present invention.

This removal of the tine assembly in the aforesaid Field patent is time consuming, especially if the tine assembly becomes rusted or corroded to the drive shaft from which it is to be removed. This may be an almost impossible task.

The tine tiller of the present invention avoids this problem in that there is no necessity to transfer the tines from one side of the tiller to the other. Instead, it is only necessary for the operator to manually move a shift lever to reverse the direction of rotation of the tines.

When the cutting edge of each of the tines strikes the ground, there is an angle between the heel of the tine and the ground with this angle being known as the heel or rake angle. With the tine tiller of the present invention, the heel or rake angle can be different for rotation in opposite directions. Thus, the tine tiller of the present invention is capable of having each of its tines with different cutting heel or rake angles depending upon its direction of rotation so as to be most efficient in tilling the soil. This type of arrangement would not be available with the tine assembly of the aforesaid Field patent since mounting the tine assembly on opposite sides would produce the same heel or rake angle if the tine assembly of the aforesaid Field patent were to have one of the tine assemblies on each side of the shaft simultaneously although that is not contemplated.

The tine tiller of the present invention has each of the tines preferably retained in either of its two tilling positions by retaining means rather than depending solely upon the direction of rotation to hold the tine in the desired tilling position. In the aforesaid Field patent, each of the tines depends solely upon the direction of rotation to hold it in the desired position, and there is no contemplation of any retaining means to positively retain the tines in the position to which they are moved by rotation of the tine assembly.

An object of this invention is to provide a tine tiller capable of having its tines rotate in either direction irrespective of the direction of motion of the tiller.

Another object of this invention is to provide a tine tiller having the speed of the tines independent of the ground speed of the tiller.

Other objects of this invention will be readily perceived from the following description, claims, and drawings.

This invention relates to a tine tiller including a frame, wheel means rotatably supported by the frame, and first rotating means to cause rotation of the wheel means in either direction to advance the frame in either direction. Tine assembly means is supported by the frame and includes a plurality of rotatably mounted tines for engaging soil to be tilled. The tine tiller also has second rotating means to cause rotation of the tines in either direction irrespective of the direction of rotation of the wheel means.

The tine assembly means includes a shaft rotatably supported by the frame, means to connect each of the tines to the shaft for rotation therewith, each of the tines having a cutting edge on opposite sides thereof so that one of the cutting edges engages the soil to till the soil when the second rotating means rotates the tines in one direction with each of the tines in a first tilling position and the other of the cutting edges engages the soil to till the soil when the second rotating means rotates the tines in the other direction with each of the tines in a second tilling position, and control means to control the tilling position of each of the tines during rotation in each direction. The connecting means includes two pairs of plates on each side of the frame and connected to the shaft with each of the plates having a circular periphery and being of the same diameter, a plurality of pivotal mounting means supported by the plates at the same radial distance from the center of the shaft and at equally angular spaced distances from each other, and each of the pivotal mounting means having one of the tines pivotally mounted thereon for movement between the first tilling position of each of the tines during rotation in one direction and the second tilling position of each of the tines during rotation in the other direction. The control means includes a plurality of stop means supported by the plates at the same radial distance from the center of the shaft at equally angularly spaced distances from each other, each of the tines engaging one of the stop means in each of its tilling positions, and an annular member mounted on the shaft and formed of a resilient material to engage each of the tines in each of its first and second tilling positions when each of the tines is engaging one of the stop means. Motive means is connected to the wheel means by connecting means of the first rotating means. A first shaft is driven at a speed having a constant ratio to the speed of the motive means. The second rotating means includes first means mounted on the first shaft for axial movement between first and second positions and second means cooperating with the first means when the first means is in its first position to rotate the tines in the one direction and cooperating with the first means when the first means is in its second position to rotate the tines in the other direction.

The attached drawings illustrate a preferred embodiment of the invention, in which:

FIG. 5 is a fragmentary sectional view of a portion of the tine drive shift transmission casing of FIG. 4 and taken along line 5-5 of FIG. 4;

FIG. 6 is a fragmentary side elevational view of a tine assembly and taken from the right hand side of FIG. 4;

FIG. 7 is a fragmentary sectional view of a portion of the tine drive shift casing of FIG. 5 and taken along line 7-7 of FIG. 5;

FIG. 8 is a top plan view of the tine shift lever for shifting the drive for the tines;

FIG. 9 is a side elevational view of the handle for the tine tiller and showing its four vertical positions;

FIG. 10 is a front elevational view of the handle for the tine tiller;

FIG. 11 is a top plan view, partly in section, of the connection of the handle for horizontal movement;

FIG. 12 is a fragmentary side elevational view, partly in section, of a locking arrangement for a control lever;

FIG. 25 is a top plan view of a bracket having locking means for cooperation with the locking bar to hold the guide handle for the tine tiller in various positions to which it is moved;

Figure 1:
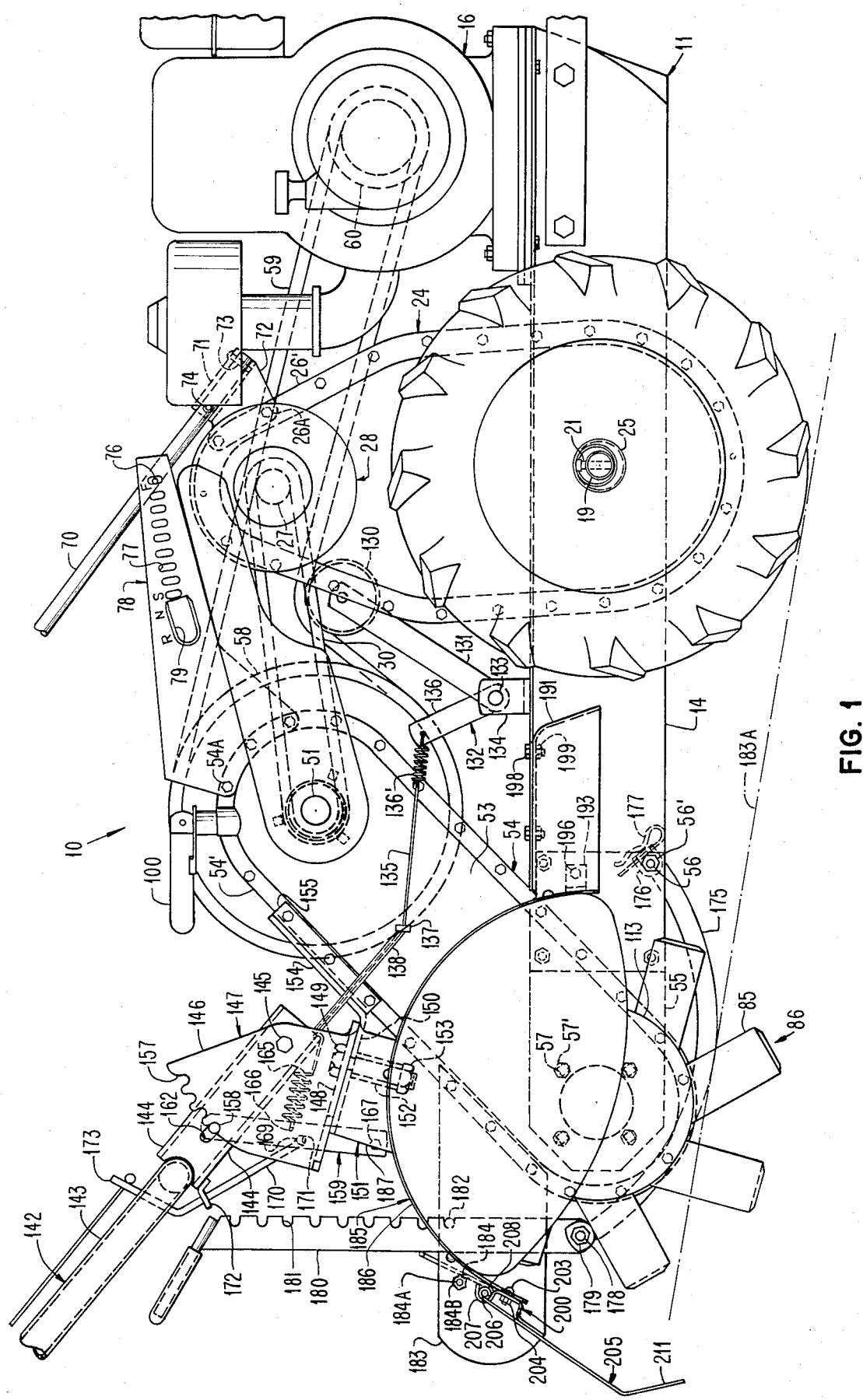
FIG. 1 is a side elevational view of a tine tiller of the present invention.

Referring to the drawings and particularly FIG. 1, there is shown a rotary tine tiller 10 including a longitudinal main frame 11. The frame 11 includes a pair of longitudinally extending L-shaped angle members 14 and 15 (see FIG. 2), which are spaced from each other and secured to each other by suitable means such as bolts, spacers, and nuts, for example.

The front end of the frame 11 has an engine 16 mounted thereon for driving a pair of traction wheels 17 and 18, which are mounted on opposite sides of the frame 11 for moving the tine tiller 10 in either direction. The traction wheels 17 and 18 are secured to a rotatably mounted shaft 19 through each of the traction wheels 17 and 18 having a hollow axle 20 sliding over one of the ends of the shaft 19 with a detachable lynch pin 21 extending through the innermost of a pair of holes 22 in each end of the shaft 19 and aligned holes 22' in the end of the axle 20. One suitable example of the pin 21 is sold by Danuser, Oklahoma City, Okla.

Figure 2:
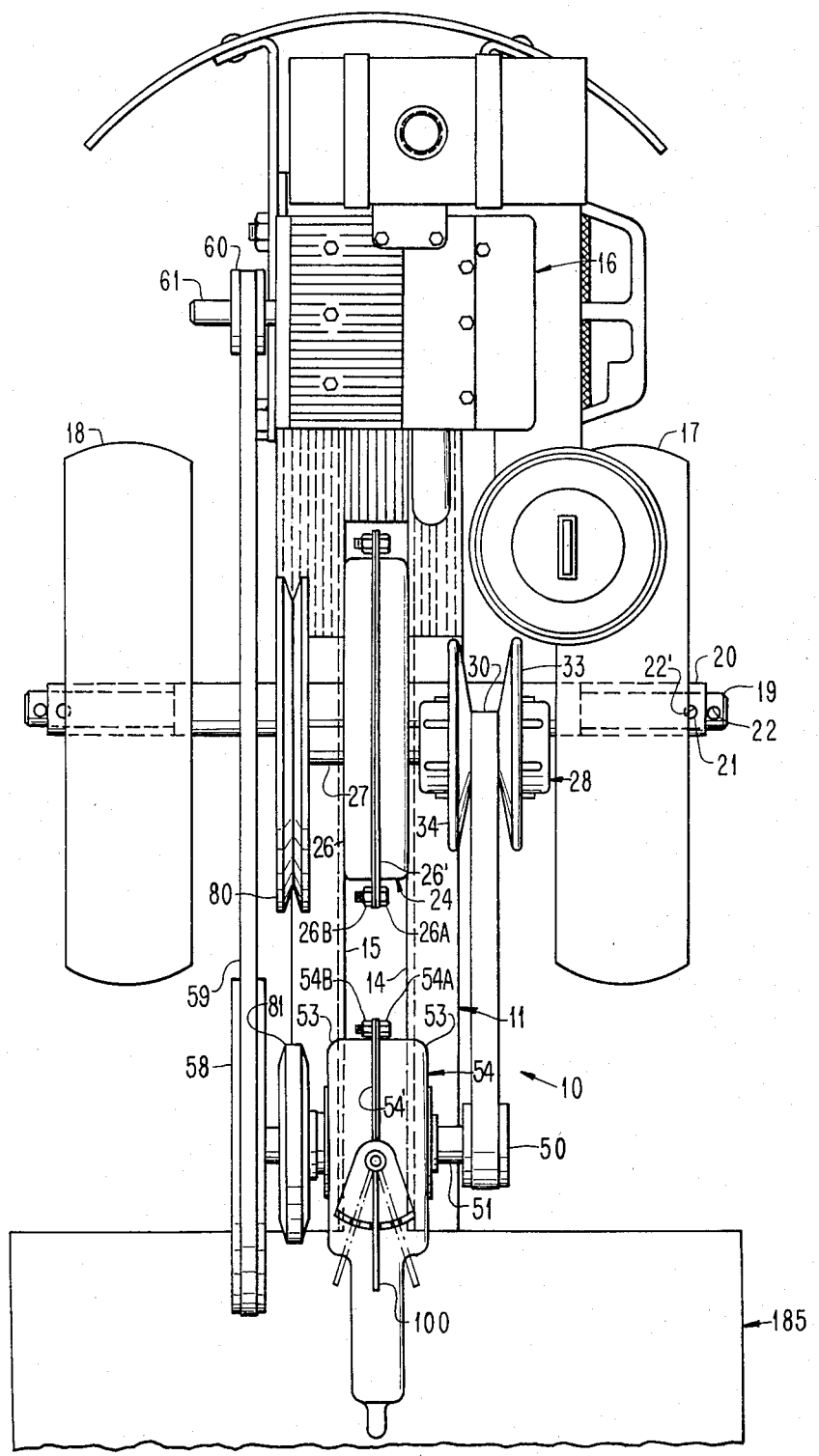
FIG. 2 is a top plan view of a portion of the tine tiller of FIG. 1.

When one of the pins 21 is in the innermost of the pair of holes 22 at each end of the shaft 19 as shown in FIG. 2, the traction wheels 17 and 18 are driven by the engine 16. When each of the pins 21 is in the outermost of the pair of holes 22 at each end of the shaft 19, the traction wheels 17 and 18 are free wheeling.

Figure 3:
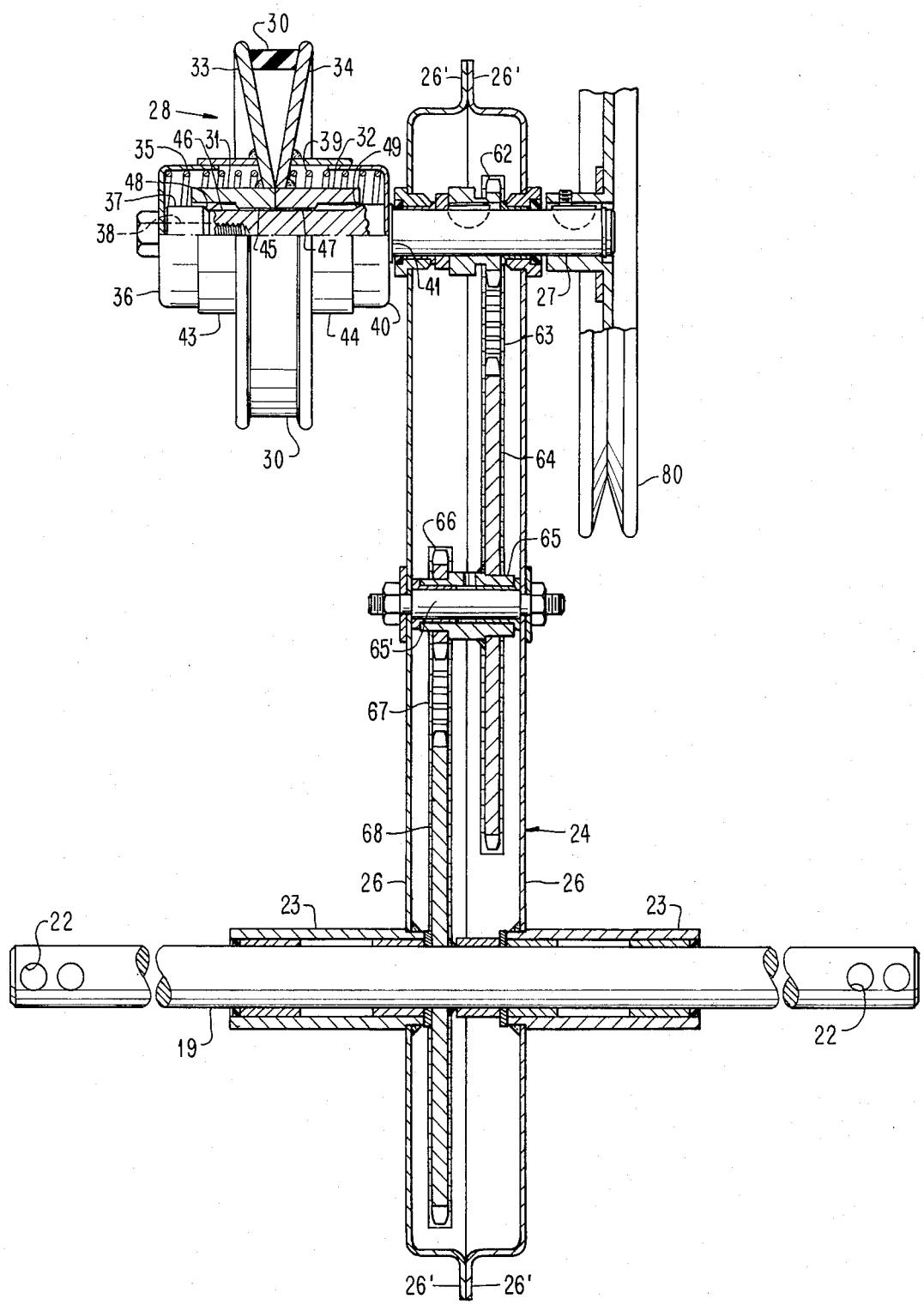
FIG. 3 is a sectional view of a chain drive casing for driving the traction wheels of the tine tiller of the present invention but without the traction wheels.

The shaft 19 is rotatably supported within bushing sleeves 23 of a chain drive casing 24 as shown in FIG. 3. The bushing sleeves 23 extend into bearing supports 25 (see FIG. 1) of each of the members 14 and 15 (see FIG. 2) of the frame 11 to rotatably support the chain drive casing 24 on the frame 11. This enables pivoting of the chain drive casing 24 about the axis of the shaft 19.

The bushing sleeves 23 (see FIG. 3) are fixed to a pair of substantially parallel walls 26 of the drive casing 24. Each of the walls 26 has a flange 26' forming its periphery. The flanges 26' are secured to each other by bolts 26A (see FIG. 2) and nuts 26B to attach the walls 26 to each other.

The upper end of the chain drive casing 24 has a shaft 27 (see FIG. 3) rotatably supported therein and extending beyond each of the walls 26 of the chain drive casing 24. One end of the shaft 27 has a pulley 28 mounted thereon to provide a variable surface for engagement by a belt 30 to produce different speeds of rotation of the shaft 27 depending on the portion of the variable surface of the pulley 28 engaged by the belt 30.

The pulley 28 includes a pair of hubs 31 and 32 slidably mounted on the shaft 27. The hub 31 has an annular plate 33 welded thereto, and the hub 32 has an annular plate 34 welded thereto. The plates 33 and 34 diverge away from each other as they extend from the hubs 31 and 32, respectively.

A spring 35 acts between a spring retainer cup 36 and the plate 33 to urge the hub 31 and the plate 33 towards the hub 32 and the plate 34. The spring retainer cup 36 is secured to the end of the shaft 27 through a stop 37 by a screw 38.

A spring 39, which is disposed between the plate 34 and a spring retainer cup 40, urges the hub 32 and the plate 34 towards the hub 31 and the plate 33. The spring retainer cup 40 is retained in position on the shaft 27 by a retaining ring 41.

The plate 33 has a guide 43 fixed thereto to guide the spring retainer cup 36. The plate 34 has a guide 44 fixed thereto to guide the spring retainer cup 40.

Accordingly, the springs 35 and 39 continuously urge the plates 33 and 34 towards each other until the hubs 31 and 32 abut. When the belt 30 is moved between the plates 33 and 34 towards the hubs 31 and 32, the forces of the springs 35 and 39 are overcome to enable the plates 33 and 34 to move away from each other. This movement of the belt 30 towards the shaft 27 increases the speed of rotation of the pulley 28 for a fixed speed of the belt 30.

The hub 31 has a splined projection 45 thereon riding in a splined track 46, which is formed in the outer surface of the shaft 27. The hub 32 has a splined projection 47, which is the same as the splined projection 45, riding in the track 46. The maximum movement of the hub 31 along the shaft 27 and away from the chain drive casing 24 is limited by the outer end of the splined projection 45 on the hub 31 engaging an inclined surface 48 on the stop 37. The movement of the hub 32 away from the hub 31 is limited by the projection 47 engaging an inclined surface 49 on the shaft 27.

The belt 30 passes around a pulley 50 (see FIG. 4), which is secured to a shaft 51. The shaft 51 is rotatably supported in bearings 52, which are mounted in supports 52' attached to walls 53 of a tine drive shaft transmission casing 54.

Each of the walls 53 of the tine drive shift transmission casing 54 has a flange 54' at its periphery in engagement with the flange 54' of the other of the walls 54. Bolts 54A (see FIG. 2) pass through aligned openings in the flanges 54' of the walls 53 and cooperate with nuts 54B to secure the walls 53 to each other.

Figure 23:
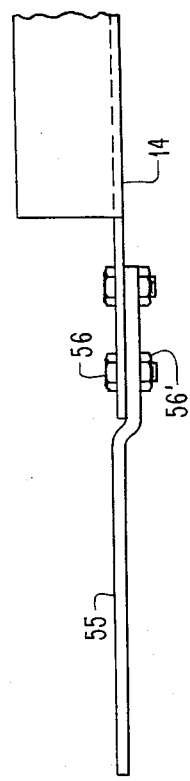
FIG. 23 is a top plan view of one of the offset extension plates mounted on one of the angle members of the frame.

The tine drive shift transmission casing 54 is supported by a pair of offset extension plates 55 (see FIGS. 1 and 4), which are secured to the rear end of each of the angle members 14 and 15 (see FIG. 2) of the frame 11 by bolts 56 (see FIG. 1) extending through four openings in each of the members 14 and 15 (see FIG. 2) and the attached extension plate 55 (see FIG. 1) with a nut 56' connected to each of the bolts 56. Each of the extension plates 55 is attached to the tine drive shift transmission casing 54 by four equally angularly spaced carriage bolts 57 and nuts 57'. Each of the extension plates 55 forms a continuation of one of the angle members 14 and 15 (see FIG. 2) as shown in FIG. 23.

The shaft 51 (see FIG. 4) has a pulley 58 mounted on its end opposite from the pulley 50. A drive belt 59 passes around the pulley 58 and a pulley 60 (see FIG. 2) on an output shaft 61 of the engine 16.

Thus, when the belt 59 is taut between the pulleys 58 and 60, drive from the engine 16 is transmitted to the pulley 50 from which it is transmitted through the belt 30 to the pulley 28 when the belt 30 is engaging the adjacent surfaces of the plates 33 and 34 of the pulley 28. As the belt 30 moves inwardly towards the shaft 27, the speed of rotation of the shaft 27 is increased for the same speed of the engine 16.

The shaft 27 (see FIG. 3) has a chain sprocket 62 keyed thereto. A chain 63 passes around the chain sprocket 62 and a chain sprocket 64, which is fixed to a shaft 65. The shaft 65 is rotatably mounted on a round stud 65' extending between the walls 26 of the chain drive casing 24 and exterior thereof. The shaft 65 has a second chain sprocket 66 thereon with a chain 67 passing therearound and around a chain sprocket 68, which is fixed to the traction wheel shaft 19.

Accordingly, rotation of the shaft 27 is transmitted to the traction wheel shaft 19 to rotate the traction wheels 17 (see FIG. 2) and 18 at a reduced speed in comparison with the speed of rotation of the engine 16. Furthermore, by pivoting the chain drive casing 24 (see FIG. 3) about the axis of the shaft 19, the speed of rotation of the traction wheels 17 (see FIG. 2) and 18 can be altered without any change in the speed of rotation of the engine 16.

Figure 31:
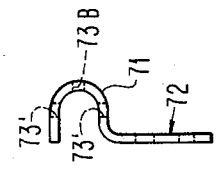
FIG. 31 is an end elevational view of a retaining bracket for the control lever.

The position of the pulley 28 (see FIG. 3) relative to the drive belt 30 is controlled through pivoting the chain drive casing 24 about the axis of the shaft 19. This pivotal movement of the chain drive casing 24 is controlled by a control lever 70 (see FIG. 1), which has one end disposed within a U-shaped portion 71 of a retaining bracket 72. The retaining bracket 72, which is mounted on the chain drive casing 24 by the bolts 26A and the nuts 26B (see FIG. 2), has the control lever 70 (see FIG. 1) connected thereto by a pivot pin 73 extending through a pair of aligned holes 73' (see FIG. 31) in the U-shaped portion 71 of the retaining bracket 72.

The U-shaped portion 71 of the retaining bracket 72 has a hole 73B through which a bolt 74 (see FIG. 1) extends along with passing through a passage in the control lever 70. A spring 75 (see FIG. 12) surrounds the end of the bolt 74 between the U-shaped portion 71 of the retaining bracket 72 and a nut 75', which is secured to the bolt 74. Thus, the spring 75 biases the control lever 70 to a position in which a pin 76, which is fixed to the control lever 70, is disposed within one of a plurality of slots 77 (see FIG. 1) in a locking bracket 78, which is fixed to the tine drive shift transmission casing 54 by the bolts 54A and the nuts 54B (see FIG. 2). The slots 77 (see FIG. 1) are formed on a radius with the axis of the shaft 19 as its center.

Accordingly, the control lever 70 can be pivoted about the pin 73 to remove the pin 76 from one of the slots 77. With the pin 76 free of the slots 77, the control lever 70 can be pulled or pushed to cause the chain drive casing 24 to pivot about the shaft 19.

The pin 76 is shown in FIG. 1 in the forwardmost slot 77, which is the maximum forward speed position and is identified by F. This position of the chain drive casing 24 is shown in FIG. 13.

The rearmost of the nine slots 77 (see FIG. 1) of the locking bracket 78 has the pin 76 disposed therein when the chain drive casing 24 has been pivoted to the minimum forward speed position and is identified by S. This position of the chain drive casing 24 is shown in FIG. 15.

Figure 14:
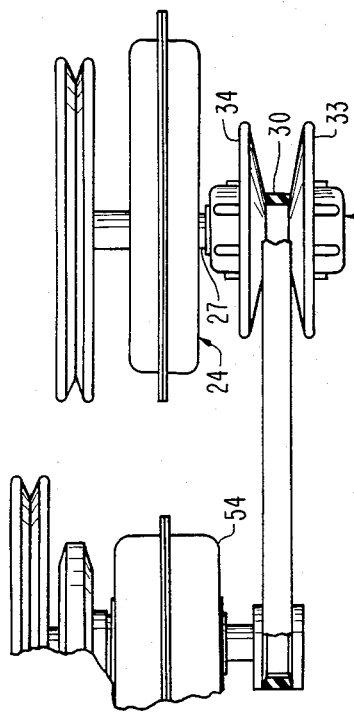
FIG. 14 is a top plan view showing the position of the variable surface of the pulley and the drive belt corresponding to the position of the chain drive casing in FIG. 13.
Figure 16:
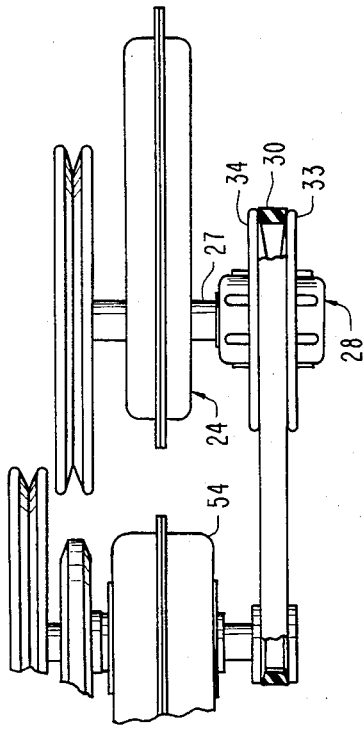
FIG. 16 is a top plan view showing the position of the variable surface of the pulley end the drive belt corresponding to the position of the chain drive casing in FIG. 15.
Figure 13:
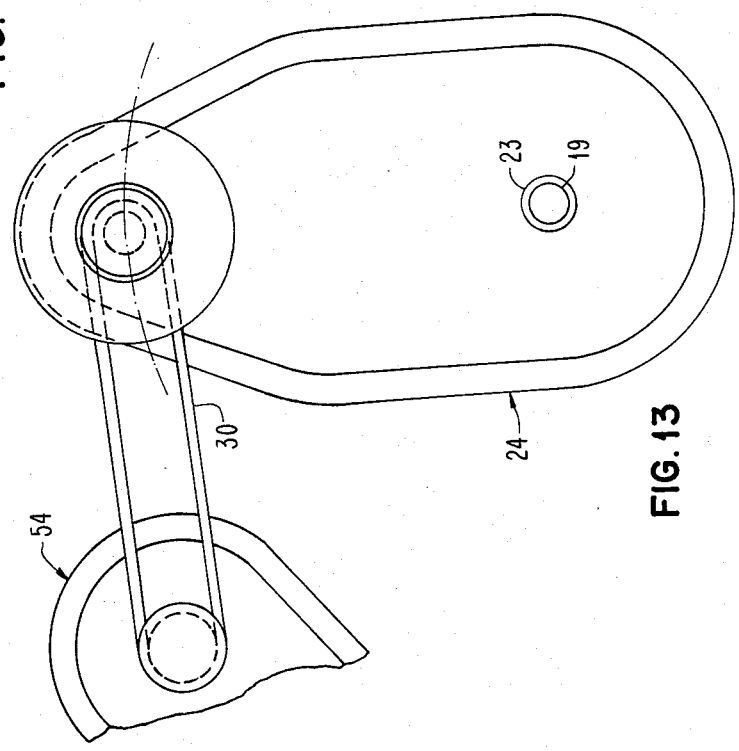
FIG. 13 is a side elevational view of the chain drive casing in its fast speed position.
Figure 15:
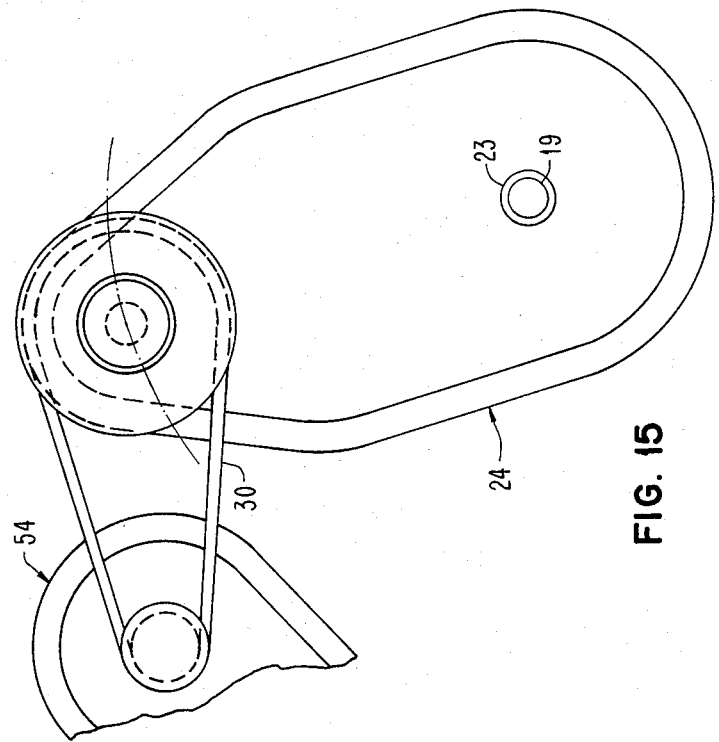
FIG. 15 is a side elevational view of the chain drive casing in its slow speed position.

As can be observed from FIGS. 14 and 16, the pivoting of the chain drive casing 24 from the position of FIG. 13 to the position of FIG. 15 moves the belt 30 outwardly relative to the plates 33 and 34 on the pulley 28 so as to engage the variable surfaces of the pulley 28 at a greater distance from the axis of the shaft 27. This decreases the speed of rotation of the shaft 27 so that the ground speed of the tine tiller 10 (see FIG. 2) is reduced because of the traction wheels 17 and 18 being rotated at a slower speed for the same speed of the engine 16.

Figure 18:
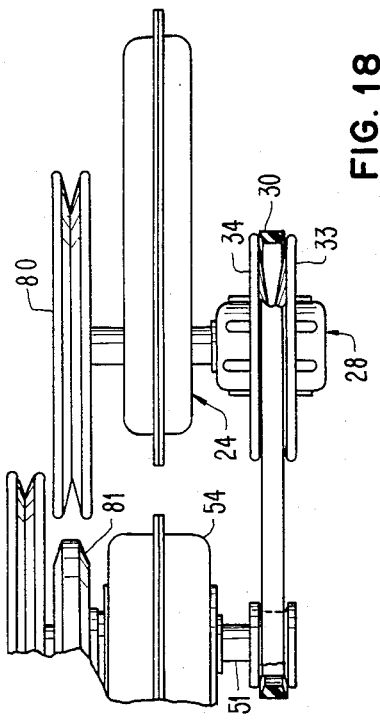
FIG. 18 is a top plan view showing the position of the variable surface of the pulley and the drive belt corresponding to the position of the chain drive casing in FIG. 17.
Figure 17:
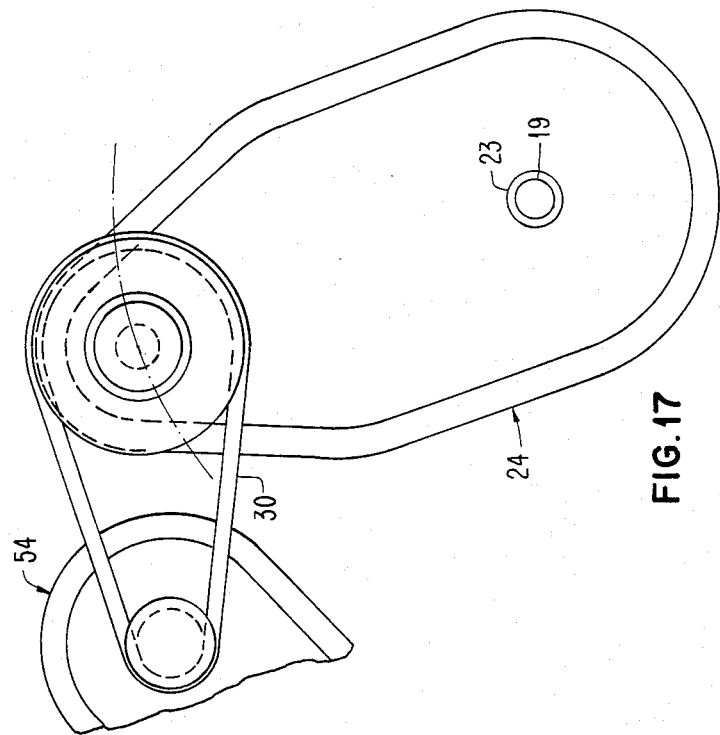
FIG. 17 is a side elevational view of the chain drive casing in its neutral position.

When the control lever 70 (see FIG. 1) is pulled so that the pin 76 is no longer disposed in any of the slots 77, then the pin 76 is disposed within an arcuate elongated slot 79 having the axis of the shaft 19 as its center. When the casing 24 is in the position of FIG. 17, the belt 30 no longer engages the plates 33 and 34 of the pulley 28, as shown in FIG. 18, so that there is no rotation of the traction wheels 17 (see FIG. 2) and 18. Thus, this is the neutral position and is identified by N (see FIG. 1) on the locking bracket 78.

Figure 20:
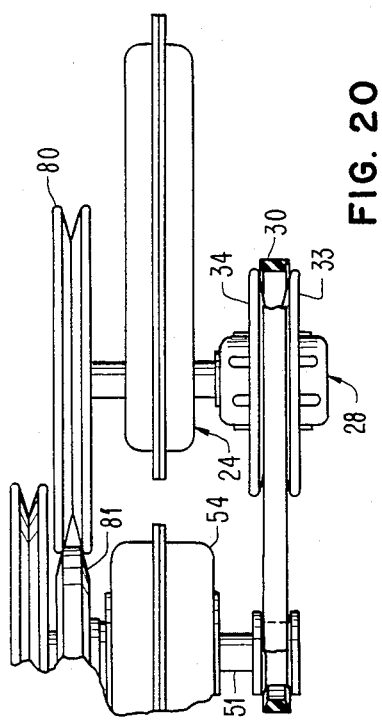
FIG. 20 is a top plan view showing the position of the variable surface of the pulley and the drive belt corresponding to the position of the chain drive casing in FIG. 19.
Figure 19:
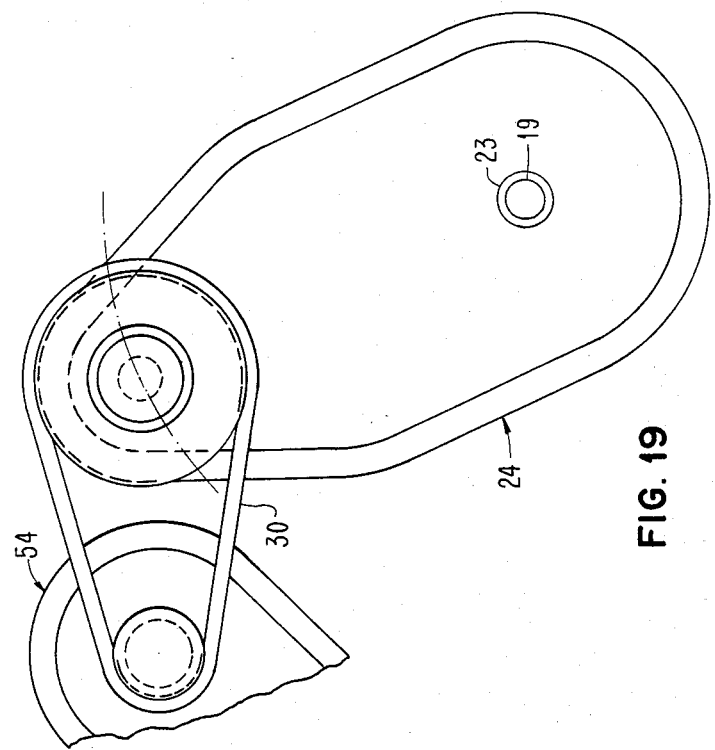
FIG. 19 is a side elevational view of the chain drive casing in its reverse speed position.

Further pulling of the control lever 70 so that the pin 76 moves along the elongated slot 79 in the locking bracket 78 and away from the slots 77 results in a pulley 80 (see FIGS. 2 and 20) on the shaft 27 being moved into engagement with a friction wheel 81, which is fixed to the shaft 51. This results in reverse rotation of the shaft 27 to reverse the direction of motion of the tine tiller 10 and this position of the pin 76 (see FIG. 1) in the elongated slot 79 is identified by R. There is no variation in speed of the tine tiller 10 in the reverse direction except by changing the speed of rotation of the engine 16.

The direction of movement of the control lever 70 is such that pushing of the control lever 70 towards the front of the tine tiller 10 not only causes forward motion of the tine tiller 10 but increases the speed of advancement. Likewise, pulling of the control lever 70 rearwardly causes the tine tiller 10 to reduce its speed until it reaches zero and then eventually reverse direction. Therefore, the motion of the control lever 70 is in the direction in which movement of the tine tiller 10 is desired.

The engine 16 also causes rotation of tines 85 of a tine assembly 86 in either direction irrespective of the direction of rotation of the traction wheels 17 and 18 (see FIG. 2). The tine assembly 86 includes a shaft 87 (see FIG. 4), which is rotatably supported by the walls 53 of the tine drive shift transmission casing 54 by bearings 87A. The bearings 87A are disposed in bearing supports 87B retained between the extension plates 55 and the walls 53 of the tine drive shift transmission casing 54.

The shaft 87 has a chain sprocket 88 fixed thereto and driven by a chain 89, which also meshes with a chain sprocket 90. The chain sprocket 90 is fixed to a shaft 91, which is rotatably supported on a bolt 92 extending between the walls 53 of the tine drive shift transmission casing 54 and retained in position by a nut 92'.

The shaft 91 has a pair of gears 93 and 94 fixed thereto on opposite sides of the chain sprocket 90. The gear 93 has fifty teeth, and the gear 94 has forty-five teeth.

The gear 93 meshes with a pinion gear 95, which is slidably mounted on the shaft 51 for axial movement therealong. The gear 95 has eighteen teeth.

Figure 4:
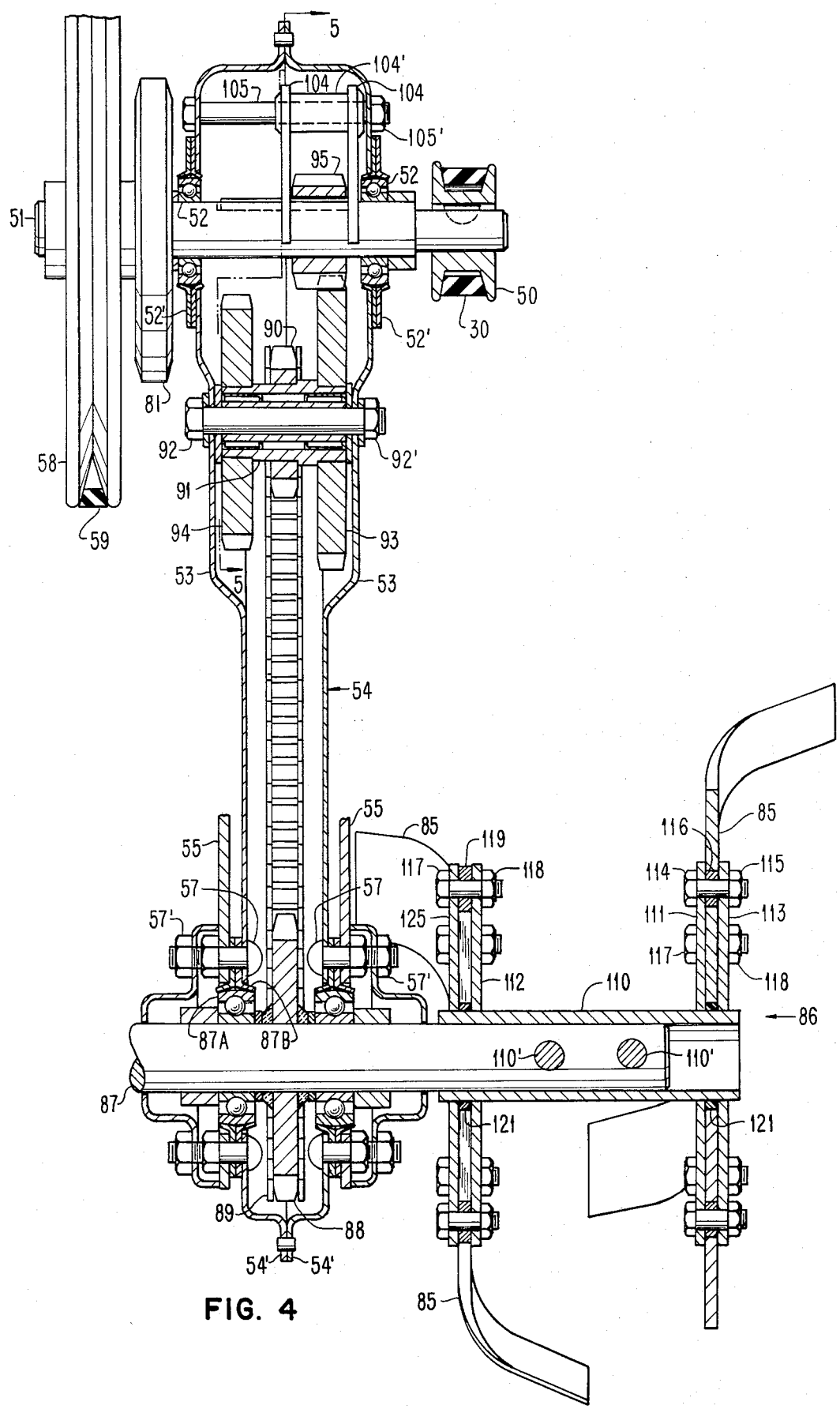
FIG. 4 is a sectional view, partly in elevation, of a tine drive shift transmission casing of the present invention.

When the gear 95 is moved from its position of FIG. 4 to the left, the gear 95 meshes with a planet gear 96 (see FIG. 5). The planet gear 96 is secured to a shaft 97 (see FIG. 7), which is rotatably mounted on a bolt 98 extending between the walls 53 of the tine drive shift transmission casing 54 and retained in position by a nut 99.

The planet gear 96, which has eighteen teeth, meshes with the gear 94 (see FIG. 5) to cause rotation of the gear 94 in the opposite direction to the rotation of the gear 93 when the gear 93 meshes with the pinion gear 95. Thus, shifting of the pinion gear 95 from engagement with the gear 93 to engagement with the planet gear 96 reverses rotation of the tine shaft 87 (see FIG. 4). Therefore, the tine shaft 87 can be rotated in either direction for tilling irrespective of the direction of rotation of the traction wheels 17 (see FIG. 2) and 18 for moving the tine tiller 10.

The pinion gear 95 (see FIG. 5) is movable between the position in which it engages the gear 93, the position in which it engages the planet gear 96, and a neutral position between the gears 93 and 96 in which it does not engage either the gear 93 or the planet gear 96 by a shift lever 100. The shift lever 100 is secured to the upper end of a rod 101, which is rotatably supported in a cylindrical bushing 102 fixed to the tine drive shift transmission casing 54 and extending through the walls 53. The lower end of the rod 101 is fixed to an angled tab 103, which extends between a pair of triangular shaped plates 104.

As shown in FIG. 4, the plates 104, which are held in spaced relation from each other by a hollow tube 104' for disposition on opposite sides of the gear 95, are slidably mounted on a bolt 105 extending between the walls 53 of the tine drive shift transmission casing 54 and retained in position by a nut 105'. The plates 104 are disposed on opposite sides of the gear 95 so that sliding movement of the plates 104 along the bolt 105 causes the pinion gear 95 to be moved from engagement with the gear 93 to a neutral position and then into engagement with the planet gear 96 (see FIG. 5) and vice versa.

As shown in FIG. 8, the shift lever 100 is retained in one of three slots 106 in an upstanding flange 107 of a plate 108, which is supported by the bushing 102 (see FIG. 5). Thus, the pinion gear 95 is retained in any of the three positions to which it is movable by the shift lever 100 being disposed in one of the three slots 106 (see FIG. 8).

As shown in FIG. 4, the tine assembly 86 includes a hollow tine mounting tube 110 (one shown) on each side of the tine drive shift transmission casing 54. Each of the hollow tubes 110 is fixed to the shaft 87 for rotation therewith by retaining pins 110' extending through aligned holes in the hollow tube 110 and a hole in the shaft 87. Each of the retaining pins 110' has an enlarged head on one end and a passage extending through the other end to receive a cotter pin.

Each of the hollow tubes 110 has a pair of circular plates 111 and 112 of the same diameter fixed thereto by suitable means such as welding and in spaced relation to each other. The plate 111 cooperates with a second circular plate 113, which is mounted on the hollow tube 110 and is the same diameter as the circular plate 111, to retain a plurality of the tines 85 (four shown) equally angularly spaced around the circular plates 111 and 113. Each of the tines 85 is retained between the plates 111 and 113 by a bolt 114 extending through aligned holes in the plates 111 and 113 and a hole in the tine 85. A nut 115 cooperates with the bolt 114 to retain the bolt 114 in position. Accordingly, each of the tines 85 is pivotally mounted on a bushing 116, which is retained by one of the bolts 114, for pivoting about the axis of the bolt 114 and the bushing 116 on which it is pivotally mounted. It should be understood that the bushing 116 is slightly longer than the thickness of the tine 85 to insure that the tine 85 can freely pivot.

A plurality of bolts 117 extends between the plates 111 and 113 at equally angularly spaced distances from each other through aligned holes in the plates 111 and 113. Thus, with four of the tines 85 pivotally mounted on the bushings 116 on the bolts 114 between the plates 111 and 113 whereby the bolts 114 are spaced 90° from each other, the bolts 117 also are spaced 90° from each other and 45° from each of the adjacent bolts 114.

The bolts 117 are retained in position by nuts 118. A stop bushing 119 is mounted on the shank of each of the bolts 117 and disposed between the adjacent surfaces of the plates 111 and 113.

It should be understood that the tines 85 are shown in FIG. 1 and in the phantom position of one of the tines 85 in FIG. 6 when the shaft 87 is rotated clockwise (as viewed in FIG. 6) and the tines 85 are shown in solid line position in FIG. 6 when the shaft 87 is rotated counterclockwise (as viewed in FIG. 6).

Thus, when the shaft 87 is rotated clockwise (as viewed in FIG. 6), an inner edge 120 of each of the tines 85 engages the bushing 119, which is disposed clockwise in direction from the pivot bolt 114 on which the tine 85 is pivotally mounted. Preferably, an annular ring 121, which is formed of a suitable elastomeric material such as urethane, for example, is mounted on the hollow tube 110 between the plates 111 and 113 and engages an inner edge 122 of each of the tines 85 when the inner edge 120 of each of the tines 85 is engaging one of the bushings 119.

The bushing 119 functions as a stop to limit the amount of pivoting of the tine 85 when the shaft 87 rotates clockwise (as viewed in FIG. 6). When the shaft 87 is rotated clockwise (as viewed in FIG. 6), an outer edge 123 of the tine 85 is its cutting edge. To aid in insuring that the tine 85 stays in this tilling position in which the inner edge 120 of the tine 85 is engaging the bushing 119, the annular ring 121 is employed. However, it should be understood that the speed of rotation of the shaft 87 should insure that the tube 85 has the inner edge 120 engaging the bushing 119 during clockwise (as viewed in FIG. 6) rotation of the shaft 87 even without the annular ring 121.

When the shaft 87 rotates counterclockwise (as viewed in FIG. 6), an outer edge 124 of the tine 85 is its cutting edge. This is on the opposite side of the tine 85 from the outer edge 123.

When the shaft 87 rotates counterclockwise (as viewed in FIG. 6), the inner edge 122 of the tine 85 engages the bushing 119, which is displaced 90° from the bushing 119 engaged by the inner edge 120 of the tine 85 when the shaft 87 was rotated clockwise (as viewed in FIG. 6). With the counterclockwise (as viewed in FIG. 6) rotation of the shaft 87, the inner edge 120 of the tine 85 engages the annular ring 121. It should be understood that the tine 85 is always engaging the annular ring 121 during its movement between its two tilling positions.

The plate 112 (see FIG. 4) cooperates with a second circular plate 125, which is the same diameter as the circular plate 112, to retain four of the tines 85 therebetween in the same manner as the plates 111 and 113. The plates 112 and 125 have the pivot bolts 114 axially aligned with the bolts 117 extending between the plates 111 and 113 and the bolts 117 axially aligned with the pivot bolts 114 extending between the plate 111 and 113.

The outer ends of two of the tines 85, which are between the plates 112 and 125 and 180° from each other, extend away from the tine drive shift transmission casing 54 while the outer ends of the other two of the tines 85, which are between the plates 112 and 125 and 180° from each other, extend towards the tine drive shift transmission casing 54. The outer ends of two of the tines 85, which are between the plates 111 and 113 and disposed 180° from each other, extend away from the tine drive shift transmission casing 54 while the outer ends of the other two of the tines 85, which are between the plates 111 and 113 and 180° from each other, extend towards the tine drive shift transmission casing 54.

The tine assembly 86 includes the same type of arrangement on the hollow tube 110 on the opposite end of the shaft 87. The tines 85 have the same arrangement relative to each other between the two pairs of the plates as the tines 85 supported by the plates 111 and 113 and the plates 112 and 125.

While each of the tines 85 has its heel 126 (see FIG. 6) at the same angle for each of the cutting edges 123 and 124, the heel angle could be different for each direction of rotation of the tines 85. This would depend upon the desired heel or rake angle with the soil being tilled in accordance with the direction of rotation. Thus, a different heel angle could be provided for one of the directions of rotation through cutting a cutout slot at the inner edge 120 or 122 to enable the tine 85 to pivot further in one direction than the other before engaging one of the bushings 119. This slot would enable further pivoting of the tine 85 to increase the heel angle in this direction of rotation. Thus, a slot in the inner edge 120 would increase the heel angle when the cutting edge 123 of the tine 85 is used in comparison with when the cutting edge 124 is used.

The speed of rotation of the shaft 87 in the clockwise direction is 180 rpm when the speed of rotation of the engine 16 (see FIG. 1) is 3600 rpm. The speed of counterclockwise (as viewed in FIG. 6) rotation of the shaft 87 is 162 rpm when the speed of the engine 16 (see FIG. 1) is 3600 rpm. This difference is due to the use of the planet gear 96 (see FIG. 5) to cause clockwise (as viewed in FIG. 6) rotation of the shaft 87.

The belt 59 (see FIG. 2) provides drive between the pulleys 58 and 60 when an idler roller 130 (see FIG. 1) is moved into engagement with the belt 59. The idler roller 130 is mounted on an arm 131 of a bellcrank 132. The arm 131 of the bellcrank 132 is attached to one end of a rod 133, which is pivotally mounted in legs of a U-shaped support 134. The U-shaped support 134 is supported by the angle members 14 and 15 (see FIG. 2) of the frame 11.

Figure 21:
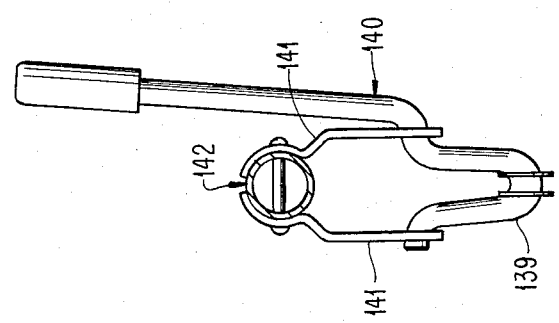
FIG. 21 is an end elevational view of a clutch lever.

The bellcrank 132 (see FIG. 1) has a cable 135 attached to its arm 136, which is attached to the opposite end of the rod 133 from the arm 131, through a spring 136'. The cable 135 passes through a guide 137, which is mounted on the tine drive shift transmission casing 54, and through a sheath 138 for connection to an arm 139 (see FIGS. 9 and 21) of a clutch lever 140, which is pivotally supported by a pair of straps 141 carried by a handle 142. Pivoting of the clutch lever 140 moves the idler roller 130 (see FIG. 1) into or out of engagement with the belt 59 to connect and disconnect the output shaft 61 (see FIG. 2) of the engine 16 to the shaft 51.

The handle 142 (see FIG. 10) includes an upper U-shaped portion 143 and a lower portion 144, which is formed as a square tube and welded to the upper U-shaped portion 143. The lower portion 144 is pivotally mounted on a horizontally disposed bolt 145 (see FIG. 1) extending through aligned openings in a pair of substantially parallel walls 146 of a bracket 147 and having a nut (not shown) secured thereto. The bracket 147 has an opening in its base 148 to receive a bolt 149 passing through a similar opening in a base 150 of a bracket 151 and into a cylindrical sleeve 152 extending downwardly from the base 150 of the bracket 151. A nut 153 is secured to the bolt 149 on the bottom end of the sleeve 152.

Figure 22:
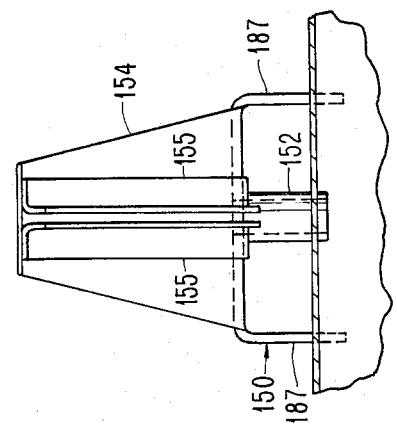
FIG. 22 is a perspective view of the mounting arrangement between the bracket and the shroud.

The bracket 151 has a portion 154 extending upwardly at an angle to the base 150. The portion 154 has a pair of L-shaped angle members 155 (see FIG. 22), which are welded to the bottom surface of the portion 154, extending downwardly therefrom to be disposed on opposite sides of the flanges 54' (see FIG. 1) of the tine drive shift transmission casing 54. Each of the angle members 155 has three openings therein to receive three of the bolts 54A, which are utilized in attaching the flanges 54' of the walls 53 of the tine drive shift transmission casing 54 to each other. Thus, the bracket 151 is secured to the tine drive shift transmission casing 54.

Figure 24:
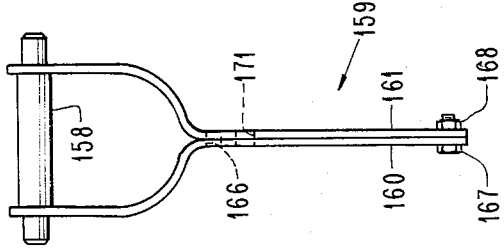
FIG. 24 is an elevational view of a locking bar.

Each of the walls 146 of the bracket 147 has four detent slots 157 therein to receive the opposite ends of a pin 158 on a locking bar 159. The locking bar 159 includes a pair of plates 160 (see FIGS. 11 and 24) and 161, which are secured to each other at their bottom ends. The upper ends of the plates 160 and 161 are spaced apart from each other for disposition on the outer surfaces of two parallel walls of the lower portion 144 (see FIG. 1) of the handle 142. The ends of the pin 158 pass through a slot 162 in each of the parallel side walls of the lower portion 144 of the handle 142 to connect the upper end of the locking bar 159 to the lower portion 144 of the handle 142. The handle 142 may be retained in any of the four positions to which it is movable by pivoting about the bolt 145 through the ends of the pin 158 being disposed in one of the slots 157 in each of the two walls 146 of the bracket 147.

The portions of the plates 160 (see FIGS. 11 and 24) and 161, which are secured to each other, extend through a slot 163 (see FIG. 11) in the base 148 of the bracket 147. The locking bar 159 also has the secured portions of the plates 160 and 161 pass through one of three slots 164 (see FIG. 25) in the base 150 of the bracket 151.

The locking bar 159 (see FIG. 1) has one end of a tension spring 165 attached thereto by a hook in the end of the spring 165 fitting within an opening 166 in the locking bar 159. The other end of the spring 165 has a hook to fit within the open bottom end of the lower portion 144 of the handle 142. Thus, the spring 165 continuously urges the ends of the pin 158 into one of the slots 157 in each of the walls 146 of the bracket 147.

The amount of pivoting of the handle 142 about the bolt 145 is limited by a bolt 167, which extends through aligned openings in the bottom ends of the plates 160 (see FIG. 24) and 161 of the locking bar 159 to secure the bottom ends of the plates 160 and 161 to each other. The bolt 167, which has a nut 168 secured thereto, engages the bottom surface of the base 150 (see FIG. 1) of the bracket 151 to limit the upward pivotal movement of the handle 142 about the bolt 145.

The handle 142 also is pivotal horizontally to three different positions (One being aligned with the longitudinal axis of the tine tiller 10 and the other two positions disposing the handle 142 on opposite sides of the longitudinal axis of the tine tiller 10 to enable the user to not walk in the tilled area.) through the bracket 147 being pivoted about the axis of the bolt 149. The handle 142 is retained in any of the three positions to which it is moved through the locking bar 159 being disposed in one of the slots 164 (see FIG. 25) in the base 150 of the bracket 151.

The locking bar 159 (see FIG. 1) has a bent end 169 of a handle position control lever 170 connected thereto by the end 169 being disposed in an opening 171 in the secured portion of the plates 160 (see FIGS. 11 and 24) and 161 of the locking bar 159 and retained therein by a push nut. The retention of the bent end 169 (see FIG. 1) of the handle position control lever 170 by the push nut also aids in securing the bottom ends of the plates 160 (see FIGS. 11 and 24) and 161 to each other.

The handle position control lever 170 (see FIG. 1) extends through a guide 172, which is fixed to a wall of the hollow square tube forming the lower portion 144 of the handle 142. The handle position control lever 170 includes a handle portion 173, which may be pulled by the operator of the tine tiller 10.

The initial pulling on the handle portion 173 of the handle position control lever 170 causes pivoting of the locking bar 159 about the pin 158 to remove the locking bar 159 from one of the slots 164 (see FIG. 25) of the bracket 151 to enable the handle 142 (see FIG. 1) to be moved sideways to any of the three positions by pivoting about the axis of the bolt 149. Continued pulling on the handle portion 173 of the handle position control lever 170 causes removal of the ends of the pin 158 from the slots 157 in which they are disposed so that the handle 142 can be pivoted about the bolt 145 to another vertical position. Thus, sideways pivoting of the handle 142 can occur without changing the vertical position of the handle 142. While the initial motion of the locking bar 159 is to remove the locking bar 159 from the slot 164 (see FIG. 25) in which it is disposed, the locking bar 159 (see FIG. 1) will not be moved out of alignment with the slot 164 (see FIG. 25) from which it is removed in the event of removing the ends of the pin 158 (see FIG. 1) from the slots 157 to enable pivoting of the handle 142 about the bolt 145 unless sideways motion is applied to the handle 142.

The tine tiller 10 has one end of an arcuate skid bar 175 pivotally connected to the frame 11 by a U-shaped bracket 176, which is welded to one end of the arcuate bar 175, fitting around one of the bolts 56 and having a spring pin 177 to retain the U-shaped bracket 176 in this position. The spring pin 177 passes through a pair of aligned openings in the legs of the U-shaped bracket 176.

Figure 28:
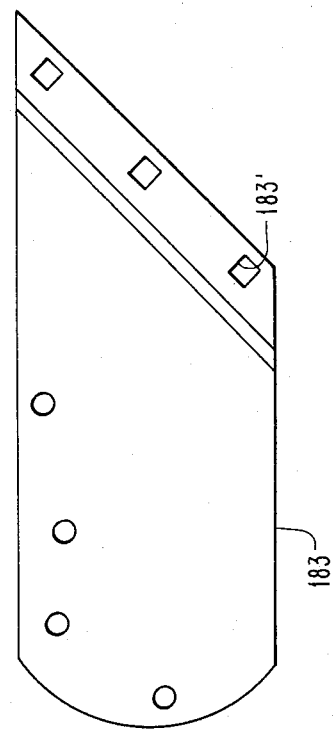
FIG. 28 is a side elevational view of a rear plate.

The other end of the arcuate bar 175 is pivotally connected by a bolt 178 and a nut 179 to the lower end of a vertically disposed depth gauge bar 180. The depth gauge bar 180 has a plurality of longitudinally spaced slots 181 formed in one of its surfaces to receive a stud 182 extending between a pair of rear plates 183. The rear plates 183 are supported on the tine drive shift transmission casing 54 through each of the rear plates 183 having three openings 183' (see FIG. 28) therein to receive three of the bolts 54A (see FIG. 1), which are utilized to secure the flanges 54' of the walls 53 of the tine drive shift transmission casing 54 to each other. Each of the rear plates 183 has an offset portion (see FIG. 28) bearing against the flange 54' (see FIG. 1) of the tine drive shift transmission casing 54.

When the depth gauge bar 180 is pulled upwardly to its uppermost position whereby the lowermost of the longitudinally spaced slots 181 is receiving the stud 182 as shown in the position of FIG. 1, the arcuate bar 175 is disposed to allow the maximum penetration by the tines 85 into the soil and is engaging ground 183A. When the depth gauge bar 180 is moved downwardly to its lowermost position in which the uppermost of the longitudinally spaced slots 181 is receiving the stud 182, the arcuate bar 175 is positioned beneath the circumferential path of the tines 85 during their rotation. Thus, this is a transport position in that it protects the tines 85 when moving the tine tiller 10 since the arcuate bar 175 is still engaging the ground 183A.

The positioning of the depth gauge bar 180 so that any of the other of the slots 181 receives the stud 182 produces a varying amount of penetration by the tines 85 into the soil. Thus, the depth gauge bar 180 not only controls the penetration of the tines 85 into the soil but also enables the tines 85 to be held out of engagement with the ground 183A when it is desired to transport the tine tiller 10.

The depth gauge bar 180 is retained in the position in which it is disposed by a torsion spring 184 urging the wall of the slot 181 receiving the stud 182 against the stud 182. The spring 184 is mounted between the rear plates 183 on a bolt 184A extending between the rear plates 183 and cooperating with a nut 184B.

When the arcuate bar 175 is moved to the transport position and the shift lever 100 is disposed in its neutral position, there is no rotation of the tines 85, and the tines 85 are held in spaced relation from the ground 183A because of the position of the arcuate bar 175. In this arrangement, the tine tiller 10 can have other accessories mounted thereon with the tine tiller 10 being used as the prime mover. For example, a snow blade could be mounted on the front of the tine tiller 10 if desired.

A curved shroud 185 is supported above the upper portion of the circumferential path of the tines 85. The shroud 185 has a portion of its outer curved surface 186 welded to a pair of flanges 187 extending downwardly from the base 150 of the bracket 151.

Figure 26:
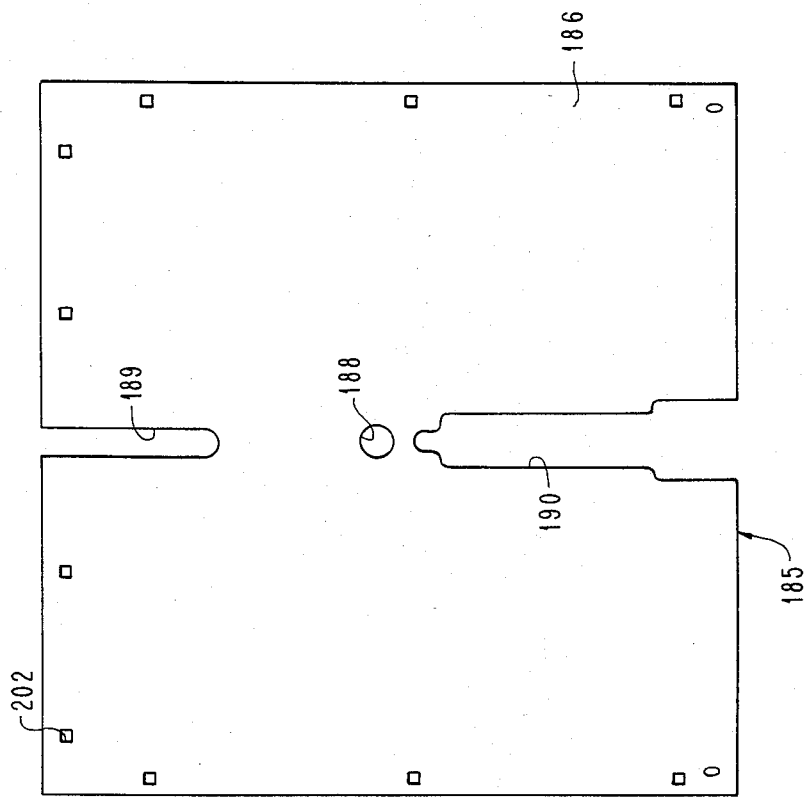
FIG. 26 is a top plan view of the shroud in its flat position prior to being bent.

The shroud 185 also has an opening 188 (see FIG. 26) in the curved surface 186 to receive the bottom end of the sleeve 152 (see FIG. 1) and the bolt 149. It should be understood that the bolt 149 does not connect the shroud 185 to the base 150 as this is done solely by the welding of the curved surface 186 of the shroud 185 to the flanges 187 of the bracket 151.

The shroud 185, which prevents any materials from being thrown upwardly towards the operator by the rotating tines 85, has a first slot 189 (see FIG. 26) extending inwardly from its rear edge to receive the rear plates 183 (see FIG. 1) and the depth gauge bar 180. The shroud 185 has a second slot 190 (see FIG. 26) extending inwardly from its forward edge to position the shroud 185 on opposite sides of the tine drive shift transmission casing 54 (see FIG. 1).

Figure 27:
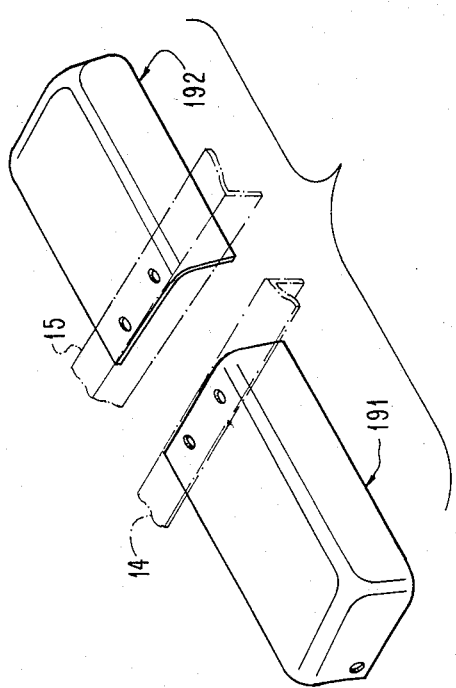
FIG. 27 is a perspective view showing two forward shrouds with portions of the members of the frame of the tine tiller on which the shrouds are mounted shown in phantom.

The shroud 185 has a pair of forward shrouds 191 and 192 (see FIG. 27) extending forwardly from its forward edge on opposite sides of the frame 11 (see FIG. 1) and attached to the shroud 185 by L-shaped tab mounts 193. Each of the tab mounts 193 has one wall attached to the shroud 185 by a screw. The other wall of each of the tab mounts 193 is retained by a screw 196 to a wall of one of the forward shrouds 191 and 192 (see FIG. 27).

The shrouds 191 and 192 are attached to the members 14 and 15, respectively, by bolts 198 (see FIG. 1) and nuts 199. The forward shrouds 191 and 192 (see FIG. 27) prevent rocks and other debris from striking the members 14 and 15 of the frame 11 when the tines 85 (see FIG. 1) are rotating counterclockwise (as viewed in FIG. 1).

Figure 29:
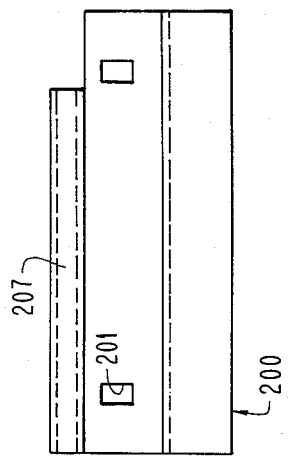
FIG. 29 is a top plan view of a hinge plate.

The bottom rear edge of the shroud 185 has a pair of hinge plates 200 secured thereto on opposite sides of the rear plates 183. Each of the hinge plates 200 has a pair of rectangular shaped holes 201 (see FIG. 29) therein for alignment with square shaped holes 202 (see FIG. 26) in the rear bottom edge of the shroud 185. A bolt 203 (see FIG. 1) passes through each of the aligned holes 201 (see FIG. 29) and 202 (see FIG. 26) and cooperates with a nut 204 (see FIG. 1) to attach the pair of hinge plates 200 to the shroud 185.

A leveling blade 205 is pivotally mounted on each of the hinge plates 200 by a pivot pin 206. The pivot pin 206 passes through an arcuate portion 207 on each of the hinge plates 200 and a pair of bearing portions 208 on the leveling blade 205.

Figure 30:
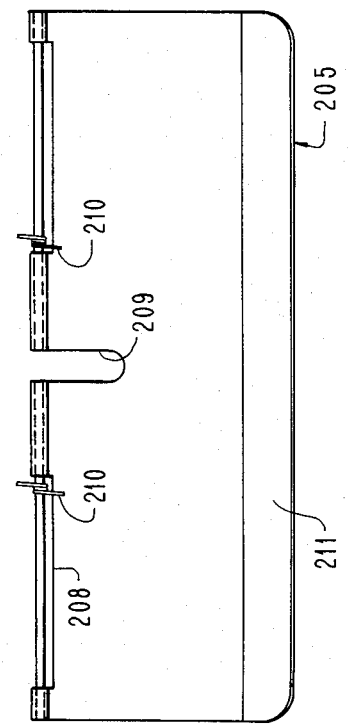
FIG. 30 is a top plan view of a leveling blade.

The leveling blade 205 has a slot 209 (see FIG. 29) extending inwardly from its forward edge to receive the rear plates 183 (see FIG. 1) therein. A spring 210 (see FIG. 30) acts between each of the hinge plates 200 (see FIG. 1) and the leveling blade 205 to continuously urge the leveling blade 205 to its leveling position.

When the leveling blade 205 is in its leveling position, its bottom portion 211 levels the soil, which has been tilled by the tines 85. Thus, the leveling blade 205 produces a level tilled soil.

Considering the operation of the present invention, the clutch control lever 140 (see FIG. 9) is pivoted to move the idler roller 130 (see FIG. 1) into engagement with the belt 59 to transmit the rotation of the engine 16 to the shaft 51 (see FIG. 2). The direction and speed of rotation of the traction wheels 17 and 18 are controlled by the control lever 70 (see FIG. 1). Thus, the tine tiller 10 can be advanced at a plurality of different speeds in the forward direction in accordance with the position of the control lever 70 as determined by which of the slots 77 has the pin 76 disposed therein. This position of the control lever 70 controls the position of the chain drive casing 24 to regulate the location of the drive belt 30 with respect to the plates 33 (see FIG. 2) and 34 of the pulley 28.

If it is desired to reverse the direction of motion of the tine tiller 10, the pin 76 (see FIG. 1) is positioned within the elongated slot 79 so that the pulley 80 (see FIG. 2) is moved into engagement with the friction wheel 81. This results in reverse motion of the tine tiller 10 at a single speed. The control lever 70 (see FIG. 1) can be moved to any of its various positions while the tiller 10 is moving in either direction. There is no need to stop movement of the tine tiller 10.

The tines 85 are rotatable in either direction, irrespective of the direction of movement of the tine tiller 10, through positioning the shift lever 100 (see FIG. 5) to dispose the pinion gear 95 in engagement with either the gear 93 or the planet gear 96. Furthermore, the tines 85 (see FIG. 6) can be held stationary at any time through disposing the shift lever 100 (see FIG. 5) in the neutral position whereby the pinion gear 95 does not engage either the gear 93 or the planet gear 96.

The direction of rotation of the shaft 87 (see FIG. 6) of the tine assembly 86 causes the tines 85 to pivot about the bolts 114 so that each of the tines 85 engages one of the bushings 119. With the preferred annular retaining ring 121 employed, each of the tines 85 also is retained by the annular ring 121.

An advantage of this invention is that the tine speed remains constant irrespective of the ground speed of the tine tiller. Another advantage of this invention is that the heel angle of the tines can be different for each direction of rotation of the tines. A further advantage of this invention is that the ground speed of the tiller can be changed without stopping. Still another advantage of this invention is that the shift lever for shifting direction of the tiller movement is in the direction of the motion desired. A still further advantage of this invention is that there is no requirement to remove the tines to change their direction of rotation. Yet another advantage of this invention is that the tine drive can be disengaged to enable the tine tiller to be employed as the prime mover for other accessories.

For purposes of exemplification, a particular embodiment of the invention has been shown and described according to the best present understanding thereof. However, it will be apparent that changes and modifications in the arrangement and construction of the parts thereof may be resorted to without departing from the spirit and scope of the invention.

I claim:

1. A tine tiller including:
a frame;
wheel means rotatably supported by said frame;
first rotating means to cause rotation of said wheel means in either direction to advance said frame in either direction;

tine assembly means supported by said frame, said tine assembly means including a plurality of rotatably mounted tines for engaging soil to be tilled;

second rotating means to cause rotation of said tines in either direction irrespective of the direction of rotation of said wheel means;

said tine assembly means including:

a shaft rotatably supported by said frame;

means to connect each of said tines to said shaft for rotation therewith;

each of said tines having a cutting edge on opposite sides thereof so that one of said cutting edges engages the soil to till the soil when said second rotating means rotates said tines in one direction with each of said tines in a first tilling position and the other of said cutting edges engages the soil to till the soil when said second rotating means rotates said tines in the other direction with each of said tines in a second tilling position;

and control means to control the tilling position of each of said tines during rotation in each direction;

said connecting means including:

two pairs of plates mounted on each side of said frame and connected to said shaft;

each of said plates having a circular periphery and being of the same diameter;

a plurality of pivotal mounting means supported by said plates at the same radial distance from the center of said shaft and at equally angular spaced distances from each other;

and each of said pivotal mounting means having one of said tines pivotally mounted thereon for movement between the first tilling position of each of said tines during rotation in one direction and the second tilling position of each of said tines during rotation in the other direction;

said control means including:

a plurality of stop means supported by said plates at the same radial distance from the center of said shaft at equally angularly spaced distances from each other, each of said tines engaging one of said stop means in each of its tilling positions;

and an annular member mounted on said shaft and formed of a resilient material to engage each of said tines in each of its first and second tilling positions when each of said tines is engaging one of said stop means;

motive means;

said first rotating means including connecting means to connect said motive means to said wheel means;

a first shaft driven at a speed having a constant ratio to the speed of said motive means;

said connecting means of said first rotating means including:

a first pulley mounted on said first shaft;

a second shaft;

a second pulley mounted on said second shaft, said second pulley having a variable surface;

a belt passing around said first pulley and said variable surface of said second pulley;

means to connect said second shaft to said wheel means;

and means to shift the distance of said second shaft from said first pulley to change the speed of rotation of said second shaft for a constant speed of said first pulley through changing where said belt engages said variable surface of said second pulley;

said first rotating means including means to reverse the direction of rotation of said second shaft when said shifting means of said first rotating means has shifted said second shaft so that said second pulley is no longer driven from said first pulley;

and said second rotating means including:

first means mounted on said first shaft for axial movement between first and second positions;

and second means cooperating with said first means when said first means is in its first position to rotate said tines in the one direction and cooperating with said first means when said first means is in its second position to rotate said tines in the other direction.

2. The tine tiller according to claim 1 including means to move said first means of said second rotating means between its first position and its second position.

3. The tine tiller according to claim 2 in which:

said first means of said second rotating means includes a gear slidable axially along said first shaft;

and said second means of said second rotating means includes:

support means;

first gear means rotatably mounted on said support means and engaging said gear of said first means when said first means is in its first position;

second gear means rotatably mounted on said support means and engaging said gear of said first means when said first means is in its second position;

and drive means rotatably mounted on said support means and driven in one direction when said first gear means engages said gear of said first means and in the opposite direction when said second gear means engages said gear of said first means, said drive means rotating said shaft of said tine assembly means in the one direction when said drive means is driven in the one direction and rotating said shaft of said tine assembly means in the other direction when said drive means is driven in the opposite direction.

4. A tine tiller including:

a frame;

wheel means rotatably supported by said frame;

first rotating means to cause rotation of said wheel means in either direction to advance said frame in either direction;

tine assembly means supported by said frame, said tine assembly means including a plurality of rotatably mounted tines for engaging soil to be tilled;

second rotating means to cause rotation of said tines in either direction irrespective of the direction of rotation of said wheel means;

said tine assembly means including:

a shaft rotatably supported by said frame;

means to connect each of said tines to said shaft for rotation therewith;

each of said tines having a cutting edge on opposite sides thereof so that one of said cutting edges engages the soil to till the soil when said second rotating means rotates said tines in one direction with each of said tines in a first tilling position and the other of said cutting edges engages the soil to till the soil when said second rotating means rotates said tines in the other direction with each of said tines in a second tilling position;

and control means to control the tilling position of each of said tines during rotation in each direction;

said connecting means including:

two pairs of plates mounted on each side of said frame and connected to said shaft;

each of said plates having a circular periphery and being of the same diameter;

a plurality of pivotal mounting means supported by said plates at the same radial distance from the center of said shaft and at equally angular spaced distances from each other;

and each of said pivotal mounting means having one of said tines pivotally mounted thereon for movement between the first tilling position of each of said tines during rotation in one direction and the second tilling position of each of said tines during rotation in the other direction;

said control means including:

a plurality of stop means supported by said plates at the same radial distance from the center of said shaft at equally angularly spaced distances from each other, each of said tines engaging one of said stop means in each of its tilling positions;

and an annular member mounted on said shaft and formed of a resilient material to engage each of said tines in each of its first and second tilling positions when each of said tines is engaging one of said stop means;

motive means;

said first rotating means including connecting means to connect said motive means to said wheel means;

a first shaft driven at a speed having a constant ratio to the speed of said motive means;

and said second rotating means including:

first means mounted on said first shaft for axial movement between first and second positions;

and second means cooperating with said first means when said first means is in its first position to rotate said tines in the one direction and cooperating with said first means when said first means is in its second position to rotate said tines in the other direction.

5. The tine tiller according to claim 4 including means to move said first means of said second rotating means between its first position and its second position.

6. the tine tiller according to claim 5 in which:

said first means of said second rotating means includes a gear slidable axially along said first shaft;

and said second means of said second rotating means includes:

support means;

first gear means rotatably mounted on said support means and engaging said gear of said first means when said first means is in its first position;

second gear means rotatably mounted on said support means and engaging said gear of said first means when said first means is in its second position;

and drive means rotatably mounted on said support means and driven in one direction when said first gear means engages said gear of said first means and in the opposite direction when said second gear means engages said gear of said first means, said drive means rotating said shaft of said tine assembly means in the one direction when said drive means is driven in the one direction and rotating said shaft of said tine assembly means in the other direction when said drive means is driven in the opposite direction.

* * * * *

UNITED STATES PATENT AND TRADEMARK OFFICE
CERTIFICATE OF CORRECTION

PATENT NO. : 4,492,271
DATED : January 8, 1985
INVENTOR(S) : Charles W. Doering

It is certified that error appears in the above-identified patent and that said Letters Patent is hereby corrected as shown below:

Column 1, line 39, after "standard" insert --- rotating ---.

line 59, "act" should read --- cut ---.

Column 4, line 8, should not be the start of a new paragraph.

Column 5, line 23, "end" should read --- and ---.

Column 7, line 12, "shaft" should read --- shift ---.

Column 9, line 16, "shaft" should read --- shift ---.

Column 11, line 12, "tube" should read --- tine ---.

Signed and Sealed this

Eighteenth Day of June 1985

[SEAL]

Attest:

DONALD J. QUIGG

Attesting Officer

Acting Commissioner of Patents and Trademarks